United States Patent
Pozzoli

(10) Patent No.: US 6,626,291 B2
(45) Date of Patent: Sep. 30, 2003

(54) CONTAINER FOR LASER-READABLE DISCS WITH CLOSURE MEANS

(75) Inventor: Aldo Pozzoli, Inzago (IT)

(73) Assignee: Pozzoli S.p.A., Inzago (IT)

( * ) Notice: Subject to any disclaimer, the term of this patent is extended or adjusted under 35 U.S.C. 154(b) by 0 days.

(21) Appl. No.: 10/086,561

(22) Filed: Mar. 4, 2002

(65) Prior Publication Data

US 2002/0139700 A1 Oct. 3, 2002

(30) Foreign Application Priority Data

Mar. 8, 2001 (IT) ...................... MI2001A0490

(51) Int. Cl.[7] .............................................. B65D 85/57
(52) U.S. Cl. ..................... 206/308.1; 206/312; 220/230
(58) Field of Search .............................. 206/307, 308.1, 206/309–313, 493; 220/230

(56) References Cited

U.S. PATENT DOCUMENTS

| 5,748,608 | A | * | 5/1998 | Spector ...................... 206/312 |
| 5,769,217 | A | | 6/1998 | Derraugh et al. |
| 5,775,494 | A | * | 7/1998 | Taplin ...................... 206/308.2 |
| 5,788,069 | A | * | 8/1998 | Calhoun et al. ............ 206/312 |
| 5,884,761 | A | * | 3/1999 | Gelardi et al. ........... 206/308.1 |
| 5,894,924 | A | * | 4/1999 | Koch .......................... 206/310 |
| 6,186,332 | B1 | | 2/2001 | Combs |
| 6,283,283 | B1 | * | 9/2001 | Rufo et al. ............... 206/308.1 |
| 6,283,286 | B1 | * | 9/2001 | Hu .............................. 206/310 |

FOREIGN PATENT DOCUMENTS

DE           0 301 238           2/1989

* cited by examiner

Primary Examiner—Luan K. Bui
(74) Attorney, Agent, or Firm—Guido Modiano; Albert Josif; Daniel O'Byrne

(57) ABSTRACT

A container for laser-readable discs with closure means, comprising a tray which is fixed to a flap of a sleeve element and forms at least one seat for detachably accommodating a disc. The container further comprises a permanent magnet that is fixed to the tray and a ferromagnetic body that is arranged inside a closure flap.

11 Claims, 2 Drawing Sheets

CONTAINER FOR LASER-READABLE DISCS WITH CLOSURE MEANS

BACKGROUND OF THE INVENTION

The present invention relates to a container for laser-readable discs and the like with closure means.

It is known that various kinds of container for laser-readable discs, such as for example CDs, DVDs and the like, are already commercially available; they are generally constituted by a plastic tray which is connected to a sleeve element constituted by two or more flaps of printed card stock, at least one of which is superimposed on the region of the tray where the disc is retained.

In order to keep the upper flap or closure flap in the closed position, systems based on the use of magnetic rubber strips have already been introduced.

In one known solution, the closure flap has a tab, arranged on the opposite side with respect to the oscillation side, that protrudes so that it can be superimposed on the edge of the rear flap; at the end of the tab and at the edge of the rear flap there are magnetic rubber strips, which allow to provide a magnetic closure.

This solution is relatively complicated, since it exceeds the standard dimensions owing to the presence of the protruding tab.

Another solution, used with three-flap sleeves in which two flaps are alternately superimposed on the tray that contains the CD, entails placing between the two superimposed flaps magnetic rubber strips that perform closure.

All these known solutions cause a considerable bulk in terms of thickness, since the magnetic rubber has to have a certain thickness in order to obtain a sufficient magnetic closure force.

Moreover, in all commercially available solutions the magnetic closure means are visible and therefore negatively affect the aesthetics of the package.

SUMMARY OF THE INVENTION

The aim of the present invention is to solve the above described problem, by providing a container for laser-readable discs and the like with closure means that allows to use magnetic closure means without modifying the standard overall dimensions of the container.

Within this aim, an object of the invention is to provide a container in which the magnetic closure means are not visible externally and therefore do not modify the overall aesthetics of the package.

Another object of the present invention is to provide a container that can be obtained by using normal container manufacturing lines and allows to apply by virtue of automatic in-line means the elements that provide the magnetic closure.

Another object of the present invention is to provide a container for laser-readable discs and the like with closure means that is capable of giving the greatest assurances of reliability and safety in use and is further competitive from a merely economical standpoint.

This aim and these and other objects that will become better apparent hereinafter are achieved by a container for laser-readable discs and the like with closure means, comprising a tray which is fixed to a flap of a sleeve element and forms at least one seat for detachably accommodating a disc, characterized in that it comprises a permanent magnet which is fixed to said tray and a ferromagnetic body arranged inside a closure flap.

BRIEF DESCRIPTION OF THE DRAWINGS

Further characteristics and advantages of the invention will become better apparent from the description of a preferred but not exclusive embodiment of a container for laser-readable discs and the like with closure means, illustrated only by way of non-limitative example in the accompanying drawings, wherein.

DESCRIPTION OF THE PREFERRED EMBODIMENTS

Figure 1:
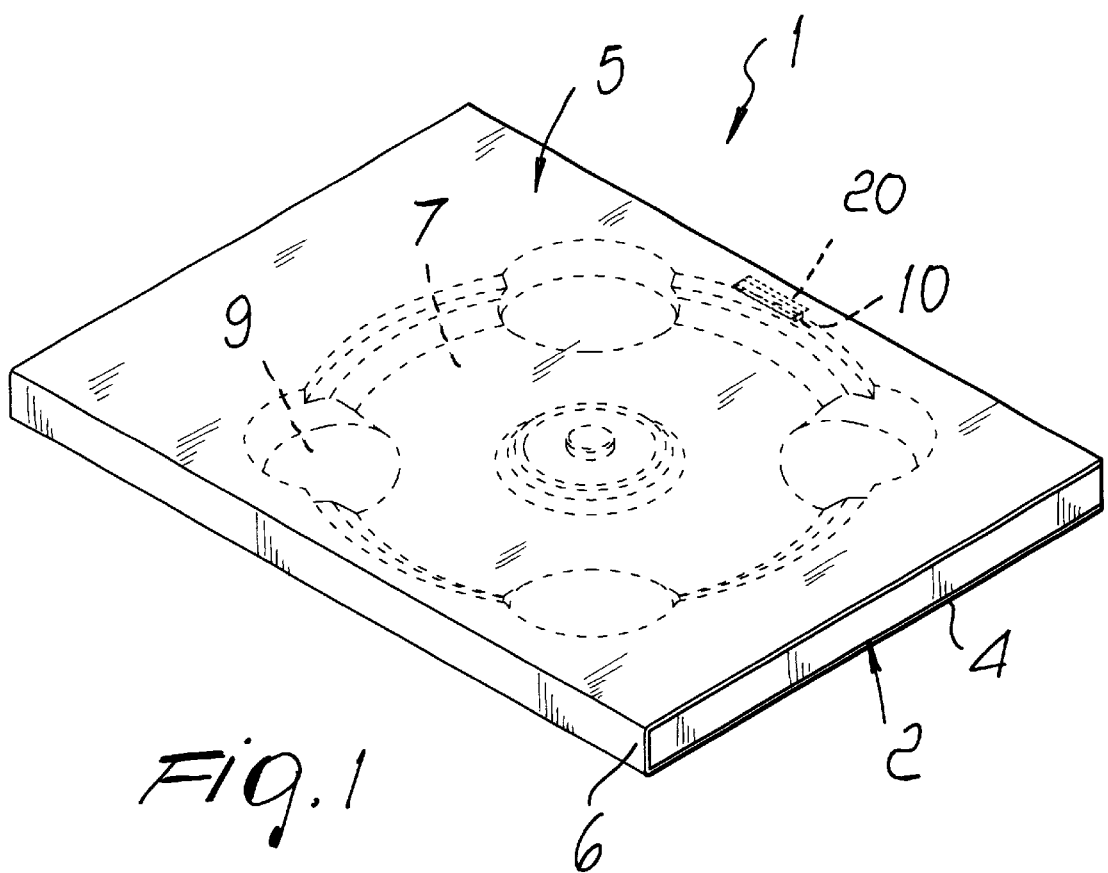
FIG. 1 is a schematic perspective view of the container according to the invention in the closed position.
Figures 3, 4:
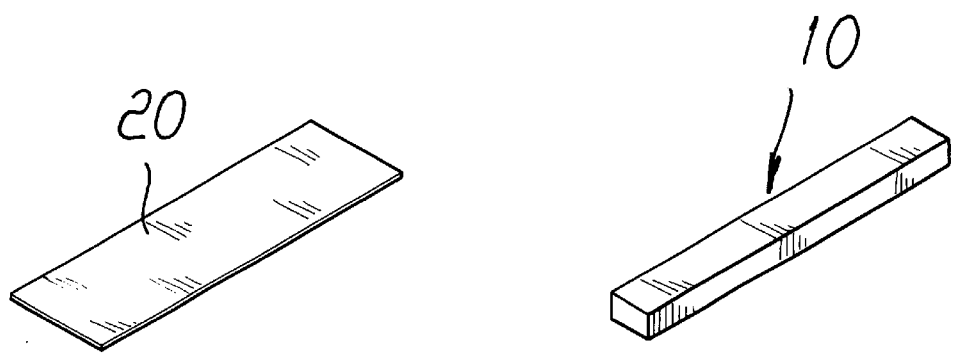
FIG. 3 is a schematic perspective view of the permanent magnet.
FIG. 4 is a schematic perspective view of the ferromagnetic body.
Figure 2:
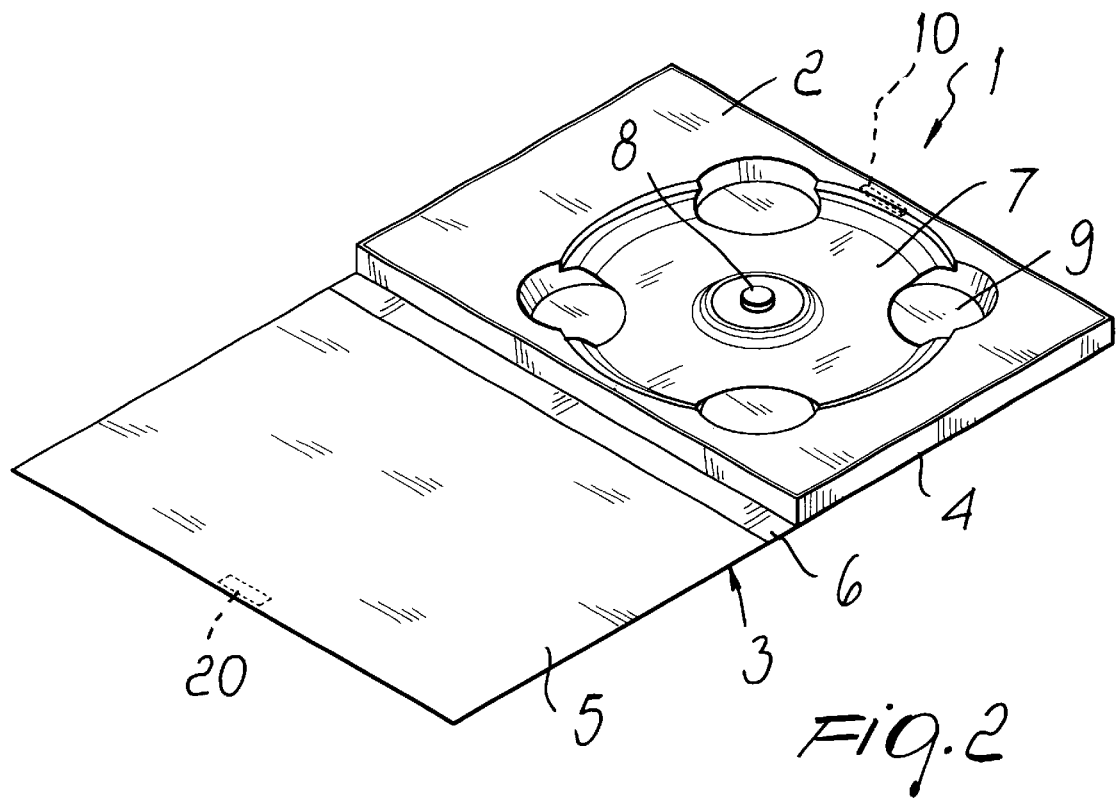
FIG. 2 is a perspective view of the container according to the invention in the open position.
Figure 5:
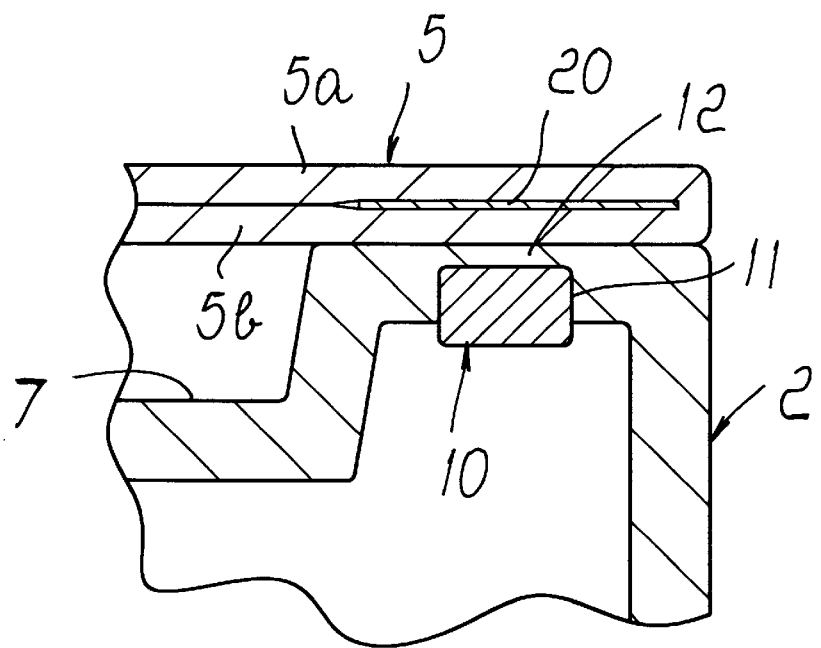
FIG. 5 is an enlarged-scale sectional view of the functional coupling between the permanent magnet and the ferromagnetic body arranged inside the container.

With reference to the figures, the container for laser-readable discs and the like with closure means, according to the invention, generally designated by the reference numeral 1, comprises a tray 2 of a per se known type, which is fixed to a sleeve element generally designated by the reference numeral 3.

In a conventional manner, the sleeve element 3 has a rear flap 4 onto which the tray 2 is fixed and over which the closure flap 5, connected to the rear flap 4 by means of a spine 6, can be folded.

In a per se known manner, the tray 2 forms a seat 7 for accommodating a disc such as a CD, DVD and the like, which has a central hub 8, also of a known type, and grip recesses 9 arranged perimetrically in order to allow access to the disc.

The particularity of the invention is that there is a permanent magnet constituted by a bar 10, which is preferably made of neodymium or other rare earth elements and is rigidly connected to the tray 2.

Preferably, the magnet 10 is inserted in an interlocking seat 11 that can be accessed from the rear face of the tray 2, so that the magnet is not visible.

At the region where the permanent magnet 10 is provided, the front surface of the tray 2 has a thinner portion 12.

Correspondingly, a ferromagnetic body 20 is provided in the closure flap 5 and is formed by a steel lamina that can be positioned automatically between the outer layer 5a and the inner layer 5b of the closure flap 5.

The thickness of the plate 20 is such that in practice it does not create an excess thickness and is therefore practically invisible; such thickness is lower than 0.4 mm, preferably 0.2 mm.

The permanent magnet 10 emits magnetic lines of flux that are substantially perpendicular to the upper face of the tray 2 and are accordingly substantially perpendicular to the ferromagnetic body 20 when the flap 5 is in the closed position.

It should be added to the above that the permanent magnet 10 is arranged toward the exposed face of the tray 2, at the greatest possible distance from the bottom, in order to avoid excessive unwanted retention of stacked trays during their automatic feeding to the packaging machine.

With the above described arrangement it is possible to provide a container in which there are magnetic closure means capable of applying a sufficient magnetic closure action without having to modify in any way the standard dimensions of the containers and without the closure means being externally visible.

Moreover, the adopted solutions allow to apply automatically both the permanent magnet and the plate of ferromagnetic material during the packaging of the container, which can therefore use normal packaging lines.

The invention thus conceived is susceptible of numerous modifications and variations, all of which are within the scope of the inventive concept.

All the details may furthermore be replaced with other technically equivalent elements.

In practice, the materials used, as well as the contingent shapes and dimensions, may be any according to requirements.

The disclosures in Italian Patent Application No. MI2001A000490 from which this application claims priority are incorporated herein by reference.

What is claimed is:

1. A container for laser-readable discs with closure means, comprising a tray which is fixed to a rear flap of a sleeve element and forms at least one seat for detachably accommodating a disc, further comprising a permanent magnet which is fixed to said tray and a ferromagnetic body arranged inside a closure flap of said sleeve element.

2. The container according to claim 1, wherein said permanent magnet is constituted by a bar that is rigidly connected to said tray.

3. The container according to claim 1, wherein said magnet is inserted in an interlocking seat formed by said tray.

4. The container according to claim 3, wherein said interlocking seat is formed on an unexposed side of a front face of said tray.

5. The container according to claim 4, wherein said tray has, at said magnet, a wall that is thinner than the remaining portion of the front face.

6. The container according to claim 2, wherein said bar forms a magnetic field with lines of flux that are substantially perpendicular to a plane of arrangement of a front face of said tray.

7. The container according to claim 1, wherein said ferromagnetic body is constituted by a steel lamina.

8. The container according to claim 1, wherein said ferromagnetic body is arranged between an inner layer and an outer layer of said closure flap.

9. The container according to claim 1, wherein said ferromagnetic body has a thickness of less than 0.4 mm.

10. The container according to claim 1, wherein said permanent magnet is arranged in said tray at a greatest possible distance from a bottom of said tray.

11. The container according to claim 1, wherein said magnet and said ferromagnetic body can be inserted respectively in said sleeve element and said tray automatically on a line for packaging said container.

* * * * *